Patented Sept. 30, 1952

2,612,460

UNITED STATES PATENT OFFICE 2,612,460

METHOD OF SOLDERING

Hobart H. Willard, Ann Arbor, Mich., and William S. Gale, Syracuse, N. Y., assignors to McCord Corporation, Detroit, Mich., a corporation of Maine No Drawing. Application June 20, 1950, Serial No. 169,292

6 Claims. (Cl. 148—26)

This invention relates to a method for the soft soldering of metals.

There is a need in the art for a method of soft soldering metals in which a more efficient spreading, cleaning and wetting action by the flux takes place, in order that a strong joint will be obtained and also in order that a minimum amount of flux and solder will be consumed. There is also a need in the art for a process in which the gases evolved by the flux during the heating operation are non-corrosive to the work and to the operating equipment and are relatively non-toxic to the operating personnel.

We have discovered that a process possessing the above and additional advantages is provided by employing as the flux used in the soldering operation a composition comprising hydrazine monohydrochloride or hydrazine monohydrobromide or a mixture of such salts in a carrier or vehicle.

The concentration of the salt or salts in the composition is not critical, but rather is a matter of choice and depends primarily upon the particular type of soldering operation being carried out. Thus, the flux used can contain, for example, from 2% to 20% or more by weight of the salt or salts, the upper limit of concentration depending only upon the solubility of the salt or salts in the particular vehicle used.

As a first specific illustration, the flux used was composed of ten parts by weight of hydrazine monohydrochloride and ninety parts by weight of water. A lap joint between a sheet of brass and a sheet of copper was formed by applying the flux with a brush to the parts to be joined. The pieces were heated with a torch to a temperature of about 300° C., and a solder wire composed of three parts by weight of tin and seven parts by weight of lead was held in contact with the seam. As a result of the heating, the composition fluxed the joint system. Also, the solder was melted and drawn into the seam. Upon cooling, there was obtained a strong joint which showed no evidence of corrosion after having been subjected to a humidity test.

As a second specific illustration, the flux used was a 10% solution of hydrazine monohydrobromide in water. A uniform coating of solder on a copper panel was obtained by wetting the panel with about 0.13 gram of the solution. Approximately 0.4 gram of solder of the same composition as that used in the first illustration was placed on the panel. The entire combination was then placed on a hot plate, heated to about 300° C., and permitted to remain there one minute. During that time the solder melted and spread to cover an area of 0.96 sq. in. When this procedure was repeated, but substituting hydrazine dihydrobromide for hydrazine monohydrobromide, the spread area was only 0.63 sq. in.

As a third specific illustration, the flux used contained 5% by weight of hydrazine monohydrobromide and 95% by weight of rosin. When 0.5 gram of the flux was used in the manner described in the second illustration, the spread area was 0.73 sq. in. which compared with a corresponding area of 0.3 sq. in. when rosin alone was used as the flux.

The method described herein is generally useful in soft soldering operations, and can be used in the joining or coating of most of the commonly used metals, such as copper, brass, bronze, zinc, tinned and galvanized surfaces, and iron and steel and their alloys. The carrier used in the flux can be any of those conventionally employed in the art, including petroleum jelly, petrolatum, waxes, or alcohols.

The use of hydrazine monohydrobromide and hydrazine monohydrochloride, or a mixture thereof, is not the equivalent of using the hydrohalide salts of hydrazine in general. Thus, when hydrazine monohydrobromide and hydrazine monohydrochloride decompose in soldering, the effluent products of decomposition are primarily nitrogen and ammonia, whereas when hydrazine dihydrobromide and hydrazine dihydrochloride decompose, the corresponding effluent products contain substantial amounts of hydrogen bromide and hydrogen chloride, respectively, as well as nitrogen.

The embodiment of the present invention in which water is the carrier for the salt or salts is preferred and is unique, when considered with the prior processes in which water-containing fluxes have been used.

In the embodiment just referred to, the salts are deposited from the flux in liquid form as the water is evaporated during the heating period. As a result, the length of time in which the flux can serve to coat the work and perform its cleansing action during the operation is increased, thereby reducing the time required for the soldering, reducing the amount of flux and solder used, and providing a stronger joint.

Wetting agents have heretofore been incorporated into flux compositions, and, if desired, such agents can also be incorporated in the flux used in accordance with the present process.

We claim:

1. In soft soldering, the step of applying to the metals to be joined a flux comprising a carrier containing at least one salt selected from the group consisting of hydrazine monohydrobromide and hydrazine monohydrochloride.

2. A process as in claim 1 in which said carrier is water.

3. A process as in claim 1 in which said salt is hydrazine monohydrobromide.

4. A process as in claim 1 in which said salt is hydrazine monohydrochloride.

5. A process as in claim 1 in which said carrier is water and in which said salt is hydrazine monohydrobromide.

6. A process as in claim 1 in which said carrier is water and in which said salt is hydrazine monohydrochloride.

HOBART H. WILLARD.
WILLIAM S. GALE.

REFERENCES CITED

The following references are of record in the file of this patent:

FOREIGN PATENTS

| Number | Country | Date |
|---|---|---|
| 599,805 | Great Britain | Mar. 22, 1948 |
| 607,935 | Great Britain | Sept. 7, 1948 |
| 677,994 | Germany | July 6, 1939 |

OTHER REFERENCES

Mellor, "Comprehensive Treatise on Inorganic and Theoretical Chemistry," vol. VIII, pages 323 and 324, published 1928 by Longmans, Green and Co., New York.